US008515674B2

(12) United States Patent
Babetski

(10) Patent No.: US 8,515,674 B2
(45) Date of Patent: Aug. 20, 2013

(54) SYSTEMS AND METHODS FOR COLLECTING AND USING USER-CONTRIBUTED MAP DATA

(75) Inventor: Joshua J. Babetski, Mountville, PA (US)

(73) Assignee: Mapquest, Inc., Denver, CO (US)

( * ) Notice: Subject to any disclaimer, the term of this patent is extended or adjusted under 35 U.S.C. 154(b) by 1151 days.

(21) Appl. No.: 12/153,640

(22) Filed: May 22, 2008

(65) Prior Publication Data

US 2009/0292462 A1  Nov. 26, 2009

(51) Int. Cl.
*G01C 21/34* (2006.01)
(52) U.S. Cl.
USPC ............................................. 701/533
(58) Field of Classification Search
USPC ................................. 701/201, 533
See application file for complete search history.

(56) References Cited

U.S. PATENT DOCUMENTS

| | | | |
|---|---|---|---|
| 6,199,014 B1 | 3/2001 | Walker et al. | |
| 6,282,489 B1 | 8/2001 | Bellesfield et al. | |
| 6,321,158 B1 | 11/2001 | DeLorme et al. | |
| 6,351,710 B1 | 2/2002 | Mays | |
| 6,477,460 B2 * | 11/2002 | Kepler | 701/426 |
| 6,526,335 B1 | 2/2003 | Treyz et al. | |
| 6,711,474 B1 | 3/2004 | Treyz et al. | |
| 6,906,643 B2 * | 6/2005 | Samadani et al. | 340/995.18 |
| 6,954,697 B1 | 10/2005 | Smith | |
| 6,989,765 B2 | 1/2006 | Gueziec | |
| 7,260,474 B1 | 8/2007 | Thayathil et al. | |
| 7,373,244 B2 | 5/2008 | Kreft | |
| 2002/0029226 A1 | 3/2002 | Li et al. | |
| 2002/0049738 A1 * | 4/2002 | Epstein | 707/1 |
| 2002/0163547 A1 | 11/2002 | Abramson et al. | |
| 2005/0251331 A1 | 11/2005 | Kreft | |
| 2005/0288859 A1 | 12/2005 | Golding et al. | |
| 2006/0173841 A1 * | 8/2006 | Bill | 707/6 |
| 2007/0016368 A1 * | 1/2007 | Chapin et al. | 701/211 |
| 2007/0032949 A1 * | 2/2007 | Arai et al. | 701/211 |
| 2007/0112507 A1 | 5/2007 | Bargeron et al. | |
| 2007/0210937 A1 | 9/2007 | Smith et al. | |
| 2007/0244635 A1 * | 10/2007 | Asahara et al. | 701/207 |
| 2007/0299607 A1 * | 12/2007 | Cubillo | 701/211 |

OTHER PUBLICATIONS

Microsoft MapPoint 2004 Feature Guide (11 pages).
Prince McLean, "Google Developing Google Earth for Mac OS X," AppleInsider, http://www.appleinsider.com/articles . . . , Dec. 8, 2005, accessed Nov. 13, 2007 (3 pages).

* cited by examiner

*Primary Examiner* — Rob Pond
(74) *Attorney, Agent, or Firm* — Finnegan, Henderson, Farabow, Garrett & Dunner LLP

(57) ABSTRACT

Systems and methods are provided for collecting and using user-contributed map data. In one implementation, a computer-implemented method is provided for collecting maneuver-specific annotations. According to the method, a user is presented with a set of computer-generated driving directions comprising a plurality of maneuvers. In association with presenting to the user the set of driving directions, the method presents to the user an option to submit an annotation for one of the plurality of maneuvers. In response to presenting the option to the user, the annotation is received from the user and stored in association with an identification of the one of the plurality of maneuvers. The stored annotation may be incorporated in the set of computer-generated driving directions.

19 Claims, 7 Drawing Sheets

FIG. 5

| Maneuver | Markers | Directional Data |
|---|---|---|
| ... | ... | ... |
| 233 | 401→402→403 | Turn LEFT onto City Blvd. |
| 234 | 403→404→405 | Turn RIGHT onto Baker St. |
| ... | ... | ... |

| Maneuver | Annotation | Contributor |
|---|---|---|
| ... | ... | ... |
| 234 | Gas station on right-hand corner before turn | driver08 |
| ... | ... | ... |

(600)

SYSTEMS AND METHODS FOR COLLECTING AND USING USER-CONTRIBUTED MAP DATA

BACKGROUND

I. Technical Field

The present invention generally relates to the field of computerized systems. More particularly, the invention relates to computerized systems and methods for collecting and using user-contributed map data.

II. Background Information

Computer-generated driving directions typically provide directions based on road intersections and/or highway exits. For example, a set of computer-generated driving directions may indicate a distance until an intersection of roads (or an exit from a highway to a road) at which a change in direction is required in order to continue to a desired destination. To successfully follow computer-generated driving directions, a user of the directions must recognize roads and locate street signs or highway exits, often having little time to do so and make an appropriate change in course. Furthermore, since the user of the computer-generated driving directions is typically not familiar with the roads that are identified in the directions, the user may make navigational errors. Under these circumstances, the usefulness of the directions to the user may diminish significantly.

Humans generally recognize landmarks or other characteristics of a route more quickly and without the effort that is needed when searching for and reading signs. For example, a traveler may recognize a structure (e.g., the yellow house) more quickly than the traveler can locate and read a street sign at an intersection that is labeled "Main Street." Augmenting computer-generated driving directions with annotations that include information, such as landmarks, may make the directions easier to follow. Furthermore, the annotations may serve as reference information, which the traveler can use to confirm the accuracy a route being traveled. For example, the user will know he or she is on the correct route to a destination after passing a landmark that is identified in the directions.

However, there are several considerations that may prevent a provider of computer-generated driving directions from augmenting the directions with annotations for landmarks or other characteristics of routes. First, information concerning landmarks or other characteristics of routes is often not captured by the provider or data partners that contribute data to the provider. It is both time consuming and expensive to collect annotations for a large number of roads and highways. Second, some annotations may not apply to a set of directions unless one is traveling in a certain direction along a route. For example, an annotation may specify the side of a road at which a landmark is located and, accordingly, the annotation would provide incorrect information when traveling in the opposite direction. Third, the accuracy of annotations for driving directions is subjective. An individual following driving directions may not find some annotations useful or applicable to their circumstances.

As is evident from the foregoing, users may find computer-generated directions that include annotations preferable to directions that do not include annotations. However, it is time consuming and expensive to collect annotations and, moreover, difficult to determine which annotations are appropriate for a given route. Accordingly, there is a need for improved systems and methods for collecting annotations and selecting annotations that are appropriate for a particular set of driving directions.

SUMMARY

Consistent with a disclosed embodiment, a computer-implemented method is provided for collecting maneuver-specific annotations. The method may present to a user a set of computer-generated driving directions including a plurality of maneuvers. In association with presenting to the user the set of driving directions, the method may present to the user an option to submit an annotation for one of the plurality of maneuvers. In response to presenting to the option to the user, the annotation may be received from the user and stored in association with an identification of the one of the plurality of maneuvers. The method may incorporate the annotation in the set of computer-generated driving directions.

Consistent with another disclosed embodiment, a computer-implemented method is provided for generating driving directions that are augmented by maneuver-specific annotations. A computer-operated driving directions system may collect a user-submitted annotation for a maneuver. The user-submitted annotation may be stored in association with the maneuver. The computer-operated driving directions system may automatically generate, in response to a user request, a set of driving directions that includes a plurality of maneuvers. One of the plurality of maneuvers in the set of driving directions may be augmented with the user-submitted annotation.

Consistent with another disclosed embodiment, a computer-implemented method is provided for generating driving directions that are augmented by maneuver-specific annotations. A computer-operated driving directions system may automatically generate, in response to a user request, a set of driving directions that includes a plurality of maneuvers. A plurality of user-submitted annotations that are stored in a data storage of the computer-operated driving directions system and that are associated with one of the plurality of maneuvers may be evaluated. One of the user-submitted annotations may be selected based on a result of the evaluating and the one of the plurality of maneuvers in the set of driving directions may be augmented with the selected user-submitted annotation.

Consistent with yet another disclosed embodiment, a system is provided for generating driving directions that are augmented by maneuver-specific annotations. The system may comprise a data storage that stores a plurality of user-submitted annotations and a server. The server may automatically generate, in response to a user request, a set of driving directions that includes a plurality of maneuvers, evaluate ones of the plurality of user-submitted annotations that are associated with one of the plurality of maneuvers, select one of the user-submitted annotations based on a result of the evaluation, and augment the one of the plurality of maneuvers in the set of driving directions with the selected user-submitted annotation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 5 is an exemplary data table storing data for maneuvers, consistent with a disclosed embodiment;

FIG. 6 is an exemplary data table storing data for annotations, consistent with a disclosed embodiment;

DETAILED DESCRIPTION

Figure 1:
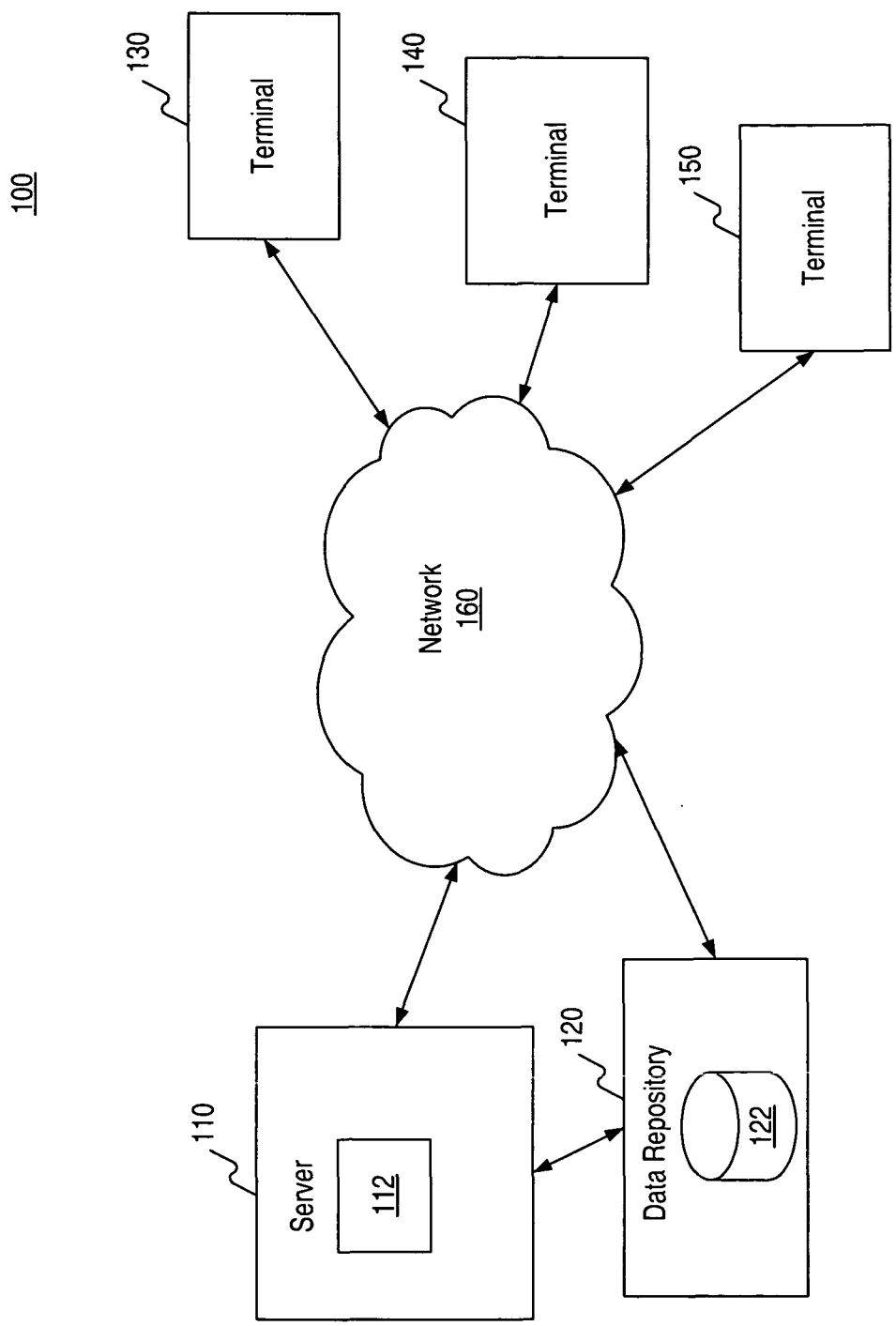
FIG. 1 is an example of a system for collecting and using user-contributed annotations for computer-generated driving directions, consistent with a disclosed embodiment.

The following detailed description refers to the accompanying drawings. Wherever possible, the same reference numbers are used in the drawings and the following description to refer to the same or similar parts. While several exemplary embodiments are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Embodiments disclosed herein provide computer-implemented systems and methods for collecting and using user-contributed map data. For example, the user-contributed map data may be used to augment computer-generated driving directions for traveling a route from a starting point to an ending point. As the term is used herein, "map data" refers to any text, image, video, and/or other visual information that is part of and/or included in or with a map. A "route" is any path from a starting point to an ending point. A "marker" is any point located before, at, or after a change of direction on a route. Markers are not typically visible in the real-world and do not typically appear on maps that are provided to users of systems that generate driving directions. "Directional data" is any information that is descriptive of a portion of a route. A "maneuver" comprises directional data and is associated with a plurality of markers. An "annotation" is descriptive of a landmark and/or other characteristic of a route. Annotations may comprise text, images sounds, and/or video.

FIG. 1 is an example of a system 100 for collecting and using user-contributed annotations for computer-generated driving directions, consistent with a disclosed embodiment. Server 110, data repository 120, and terminals 130-150 are connected to a network 160. Although a specific numbers of servers and terminals are shown in FIG. 1, FIG. 1 is exemplary and other numbers of servers and terminals may be provided. Furthermore, the functions provided by one or more devices of system 100 may be combined.

Network 160 facilitates communications between the various components of system 100, such as server 110, data repository server 120, and terminals 130-150. Server 110 may access legacy systems (not shown) via network 160, or may directly access legacy systems, data storages, or other network applications. Network 160 may be a shared, public, or private network, may encompass a wide area or local area, and may be implemented through any suitable combination of wired and/or wireless communication networks. Furthermore, network 160 may comprise a local area network (LAN), a wide area network (WAN), an intranet, and/or the Internet.

Server 110 may comprise a computer (e.g., a personal computer, network computer, server, or mainframe computer) having one or more processors (not shown) that may be selectively activated or reconfigured by a computer program. Furthermore, server 110 may distribute data for parallel processing by one or more additional servers (not shown). Server 110 may also be implemented in a distributed network. Alternatively, server 110 may be specially constructed for carrying-out methods consistent with disclosed embodiments.

Server 110 may include a memory 112 for storing program modules which, when executed by a processor, perform one or more processes for collecting and using user-contributed map annotations, as discussed in more detail below. Memory 112 may be one or more memory devices that store data as well as software and may also comprise, for example, one or more of RAM, ROM, magnetic storage, or optical storage. Since disclosed embodiments may be implemented using an HTTPS (hypertext transfer protocol secure) environment, data transfer over a network, such as the Internet, may be done in a secure fashion.

Data repository 120 may include a data storage 122 that stores data that server 110 may access when generating driving directions. For example, data storage 122 may store map data, directional data, annotations, markers, and any other data for maneuvers. Data storage 122 may store database records, such as text, images (e.g., .jpeg, .gif, etc. files), video, and/or sound recordings. Although one data storage is shown in FIG. 1, data repository 120 may include more than one data storage.

Data repository 120 may receive data from server 110, terminals 130-150, and/or other servers (not shown) available via network 160. Although shown as separate entities in FIG. 1, server 110 and data repository 120 may be combined. For example, server 110 may include one or more data storages in addition to or instead of data repository 120. Furthermore, server 110 and data repository 120 may directly exchange data or exchange data via network 160.

Terminals 130-150 may be any type of device for communicating with server 110 and/or data repository 120 over network 160. For example, terminals 130-150 may be personal computers, handheld devices, or any other appropriate computing platform or device capable of exchanging data with network 160. Terminals 130-150 may include a processor (not shown) and a memory (not shown). Furthermore, terminals 130-150 may execute program modules that provide one or more graphical user interfaces (GUIs) for interacting with network resources and/or accessing data provided by server 110. Alternatively, or in addition, terminals 130-150 may locally execute program modules providing GUIs without accessing server 110.

Figure 2:
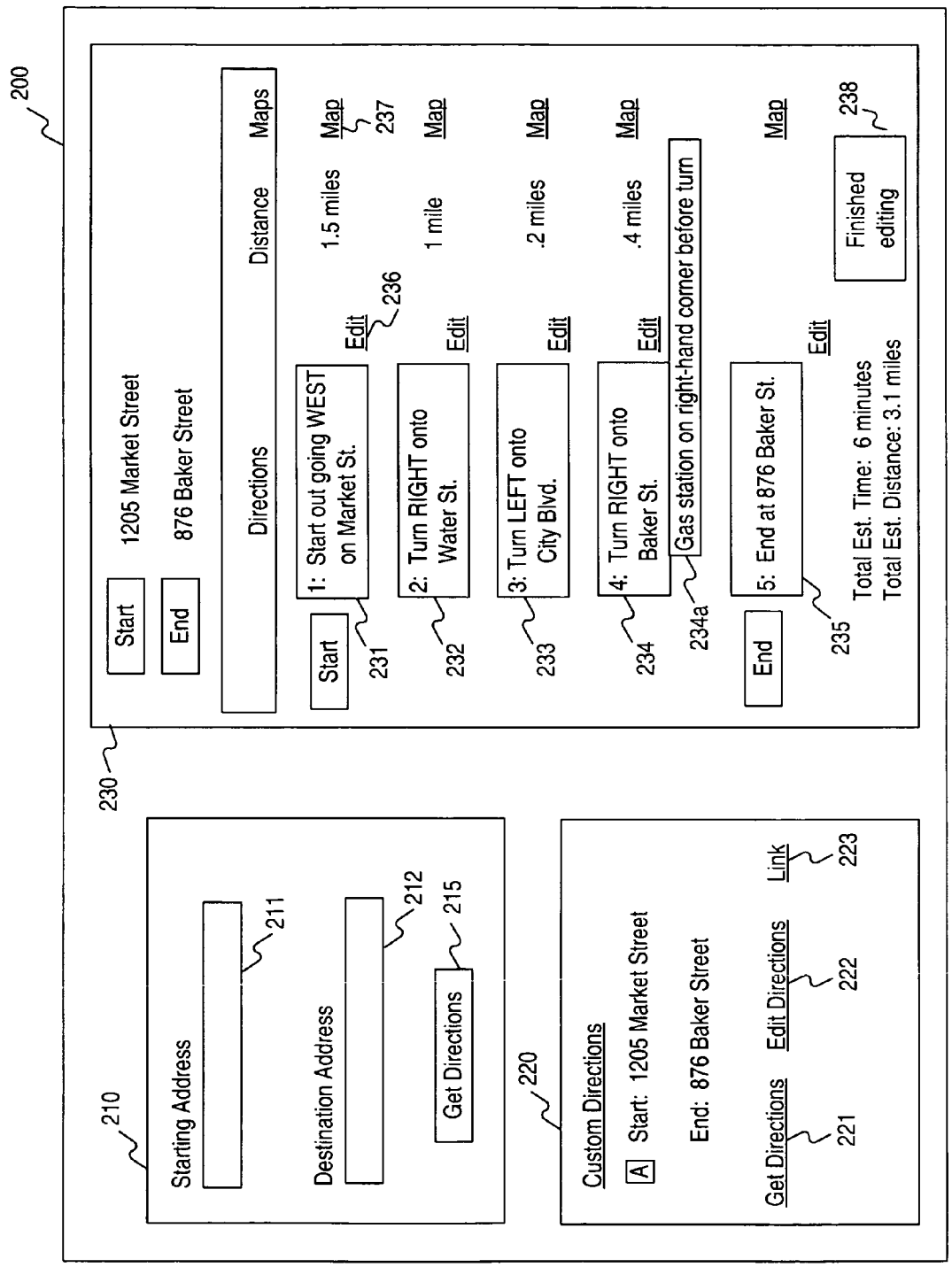
FIG. 2 is an exemplary user interface for generating and customizing driving directions, consistent with a disclosed embodiment.

FIG. 2 is an exemplary user interface 200 for generating and customizing driving directions, consistent with a disclosed embodiment. User interface 200 may allow a user to request computer-generated driving directions. Furthermore, a user may submit an annotation for a maneuver that is included in the driving directions, store the annotation with the driving directions for later use, and/or edit the content of the annotation. User-submitted annotations may also be used when generating driving directions for others, as discussed below in further detail.

Data for providing user interface 200 may be transmitted from server 110 to any one of terminals 130-150 when a user of one of terminals 130-150 navigates to, for example, an Internet site or other network location that provides functionality for obtaining computer-generated driving directions. For example, user interface 200 may constitute a document (e.g., a web page), which a user at one of terminals 130-150 may receive over network 160 and use to request driving directions.

In one implementation, a user may provide custom annotations for computer-generated driving directions. Annotations may be located more easily by users than an address or other directional data describing a maneuver (e.g., "Turn RIGHT onto Sparrow Lane"). Annotations may instead provide more descriptive and human perceivable information (e.g., "Turn RIGHT onto Sparrow Lane" could include an annotation indicating, "A car wash is located just before the turn"). Annotations may also provide other kinds of information, such as a more descriptive label associated with an address. For example, a user could include an annotation of "Grandma's House" for "123 Main Street." Other examples of annotation information include "Turn left at the shopping plaza," "Go past the yellow house with the white fence," etc.

User interface portion 210 may include data fields 211 and 212 for specifying a starting point and ending point for computer-generated driving directions. For example, to obtain computer-generated driving directions, a user typically provides a starting point (e.g., a starting address) in data field 211 and an ending point (e.g., a destination address) in data field 212. As show in FIG. 2, once a user has provided the starting point and the ending point, the user may select (e.g., by clicking or by any other means, such as voice command, touch screen, etc.) "Get Directions" button 215 to submit a request for directions to server 110.

Once the starting and ending points have been submitted, server 110 may determine a route from the starting point to the ending point. Generally, the route determined by server 110 is a direct and/or most efficient route (i.e., makes use of interstate highways instead of roads with traffic lights and has the shortest estimated travel time and/or estimated distance). Server 110 may generate driving directions by accessing data stored in, for example, data storage 122 and/or any other data storages available over network 160. After submitting the starting point and the ending point, server 110 may transmit a document (e.g., a web page) to the one of user terminals 130-150 that requested the directions. Although not shown in FIG. 2, the document may display the route on a map. For example, the map may include shaded or colored line tracing the route from the starting point to the ending point. The document including the route may be displayed as part of or separate from the driving directions.

User interface portion 220 may display a list of custom directions that are associated with a particular user. For example, a user may have an account and may be identified by logging into server 110 with credentials (e.g., a username and password). Once logged into server 110, the user may access personalized content, such as custom directions. As shown in FIG. 2, directions set "A" provides directions from a starting point (1205 Market Street) to an ending point (876 Baker Street). By selecting link 221, user interface portion 220 may display the directions associated with direction set "A" in, for example, user interface portion 230. By selecting link 222, the user may edit the directions (e.g., the user may revise an existing annotation). Selecting link 223 may allow a user to save the directions and/or send the directions to one or more individuals. Although links are shown in FIG. 2, user interface 200 may include, for example, selectable buttons, icons, or other means for selecting various options. For example, a user may send the directions to a friend via e-mail, instant messaging, or by sending a link to a webpage from which the directions may be accessed.

User interface portion 230 may include directions for traveling a route. For example, as shown in FIG. 2, user interface portion 230 includes directions for a route from a starting point located at 1205 Market Street to an ending point located at 876 Baker Street (i.e., user interface portion 230 displays directions for direction set "A" that is listed in user interface portion 220). User interface portion 230 further includes a list of maneuvers 231-235 with directional data for traveling the route. For example, maneuver 231 includes directional data indicating that the user should "Start out going WEST on Market St."; maneuver 232 includes directional data indicating "Turn RIGHT onto Water St."; maneuver 233 includes directional data indicating "Turn LEFT onto City Blvd."; maneuver 234 includes directional data indicating "Turn RIGHT onto Baker St."; and maneuver 235 includes directional data indicating "End at 876 Baker St.".

As shown in FIG. 2, a distance may be displayed with each of maneuvers 231-235 (e.g., the directions indicate to begin traveling west for 1.5 miles along Market Street). Furthermore, each of maneuvers 231-235 may be displayed near or with an "Edit" link 236 and/or a "Map" link 237. For example, "Edit" link 236 may allow a user to provide an annotation for maneuver 231. As another example, maneuver 234 includes directional data ("Turn RIGHT onto Baker Street") and is already augmented by annotation 234a ("Gas station on right-hand corner before turn"). "Map" link 237 may cause server 110 to transmit, for display at one of terminals 130-150, a map showing the route and including the location of a corresponding one of maneuvers 231-235. Maps may be displayed as part of user interface 200 or may be displayed in a separate window.

As discussed above, a user may select an option to add an annotation to one or more of maneuvers 231-235. For example, the user may select "Edit" link 236 to submit a user-contributed annotation for maneuver 231. A text box may be displayed below maneuver 231 in which the user may enter the annotation (e.g., by typing, voice command, etc.). After entering the annotation, the user may select "Finished Editing" button 238 to save the directions with the annotation. Server 110 may save the annotation for later use with the directions and/or may save the annotation for later use with other directions in which directional data corresponding to the annotations is applicable. For example, as discussed below in more detail, server 110 may retrieve annotation 234a ("Gas station on right-hand corner before turn") when generating driving directions that include maneuver 234 ("Turn RIGHT onto Baker Street"). Alternatively, or in addition, the user may send the set of directions, along with the annotation, to another person. Directions may be sent as part of an electronic message and/or instant message or an electronic message and/or instant message may include a link (e.g., a hyperlink) to a storage location from which directions may be accessed.

Figure 3:
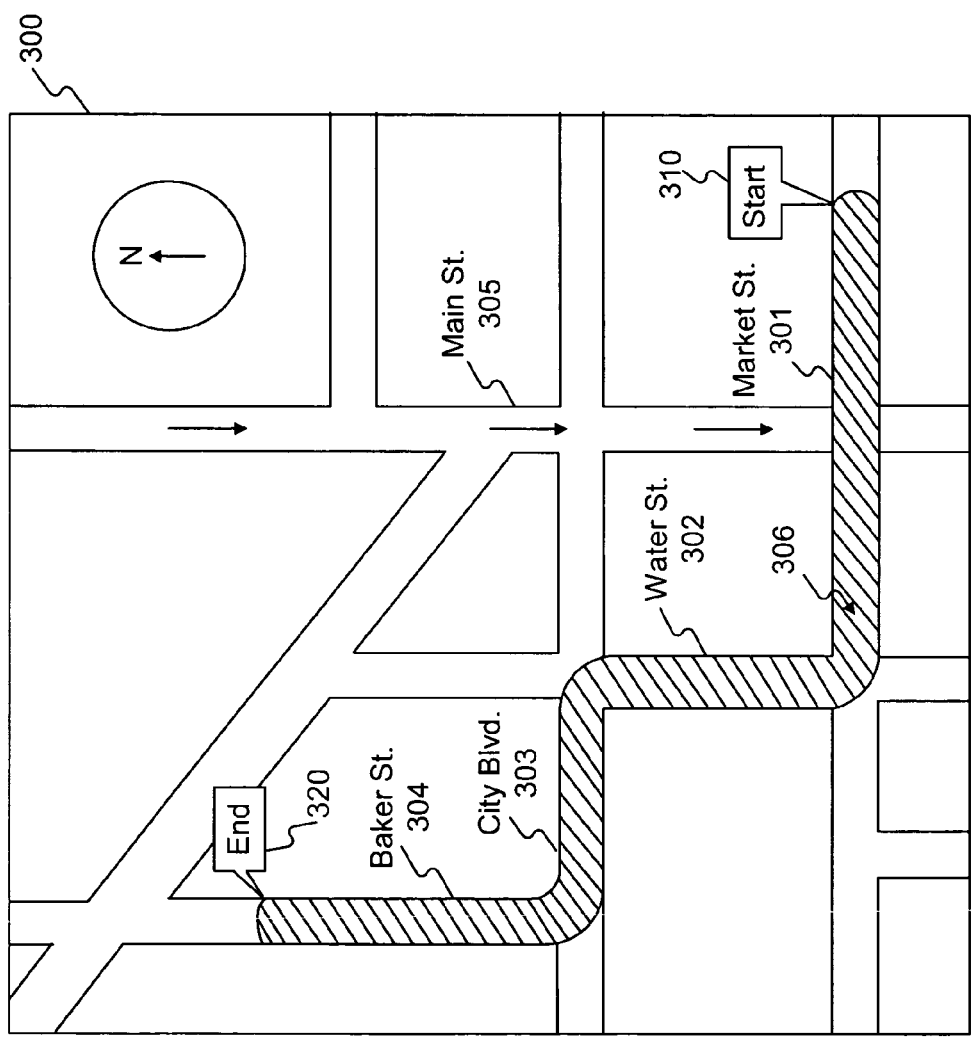
FIG. 3 is an exemplary map showing a route from a starting point to an ending point, consistent with a disclosed embodiment.

FIG. 3 is an exemplary map 300 showing a route 306 from a starting point 310 to an ending point 320, consistent with a disclosed embodiment. Route 306 may be shaded, colored, accented, highlighted, or otherwise set apart from the roads depicted in map 300. In the example shown in FIG. 3, map 300 depicts route 306 for the exemplary driving directions shown and discussed in connection with FIG. 2. In particular, starting point 310 corresponds to 1205 Market Street and ending point 320 corresponds to 876 Baker Street. Route 306 travels along Market Street 301, turns right onto Water Street 302, turns left onto City Boulevard 303, turns right onto Baker Street 304, and ends at the ending point 320, 876 Baker Street. Furthermore, as shown in map 300, Main Street 305, which is a one way road, may be designated as such by arrows in an appropriate direction. Legends, icons, text, routes, or other data, such as the one-way arrows, may be a part of map 300 or may be stored as separate map data. Map data associated with map 300 may be stored in, for example, data storage 122.

Figure 4:
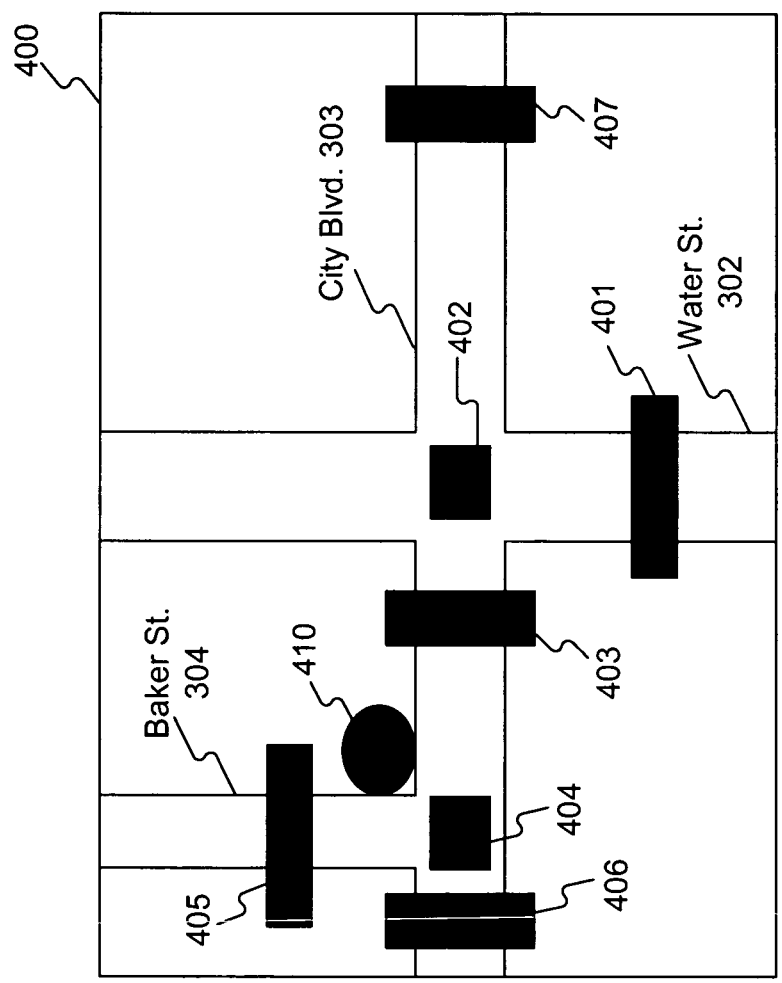
FIG. 4 is an exemplary map showing an association of markers and a route, consistent with a disclosed embodiment.

FIG. 4 is an exemplary map 400 showing an association of markers and a route, consistent with a disclosed embodiment. Since map 400 is not typically displayed or transmitted to a user, the following discussion describes the use of markers in reference to map 400 for illustrative purposes.

Map 400 shows a detailed view of a portion of map 300. In particular, map 400 depicts an intersection of Water Street 302 and City Boulevard 303, and an intersection of City Boulevard 303 and Baker Street 304. Furthermore, map 400 includes a landmark 410. In the example discussed herein, landmark 410 is a gas station. Landmarks may include any location, such as restaurants, stores, statues, signs, geography (e.g., rivers, streams, hills, etc), buildings, houses, etc.

FIG. 4 depicts markers 401-407 for illustrative purposes. As discussed above, markers are any points located before, at, or after a change of direction on a route. Markers 401-407 may be thought of as invisible points along the route. While markers 401-407 are typically not visible when traveling along the route and are not displayed on a map provided to a user of driving directions, markers 401-407 may be used when generating driving directions and/or identifying annotations for a set of directions. Furthermore, although markers 401-407 are depicted in FIG. 4, data storage 122 may store other markers (not shown) for other points along any of the routes and/or roads shown in FIG. 4.

Markers 401-407 may each have a corresponding unique identifier (e.g., a number or alphanumeric identifier). Identifiers for a group of markers that occur in sequence along a route (i.e., the markers collectively constitute a maneuver) may be stored together as a data record in data storage 122. For example, in one implementation, server 110 may store one or more annotations in association with a maneuver. As discussed above, a maneuver may comprise directional data and is associated with at least two markers. Server 110 may use a plurality of markers and/or the maneuver in order to identify one or more annotations that are applicable for the maneuver.

For example, as shown in FIG. 4, when traveling on City Boulevard 303 toward Baker Street 304, landmark 410 is located on the right-hand side of City Boulevard 303 and before the intersection. Accordingly, maneuver 234 ("Turn RIGHT onto Baker St.") may be associated with marker 403 (before the intersection), marker 404 (at the intersection), and marker 405 (after the intersection). Traveling along markers 403, 404, and 405 represents that one is traveling along City Boulevard 303 in a westerly direction and making a right turn at an intersection onto Baker Street 304. Thus, server 110 may store user-submitted annotation 234a ("Gas station on right-hand corner before turn") in association with maneuver 234, which comprises directional data ("Turn RIGHT onto Baker Street") and is associated with markers 403, 404, and 405.

FIG. 5 is an exemplary data table 500 storing data for maneuvers, consistent with a disclosed embodiment. As shown in FIG. 5, data table 500 may store maneuver 233 with data indicating that markers 401, 402, and 403 are traveled in sequence (i.e., 401→402→403) for maneuver 233. Data table 500 may also store maneuver 233 with direction data (i.e., "Turn LEFT onto City Blvd."). As another example, data table 500 may store maneuver 234 with data indicating that markers 403, 404, and 405 are traveled in sequence (i.e., 403→404→405) for maneuver 234. Data table 500 may also store maneuver 234 with directional data (i.e., "Turn RIGHT onto Baker St.").

FIG. 6 is an exemplary data table 600 storing data for annotations, consistent with a disclosed embodiment. As shown in FIG. 6, data table 600 may store maneuver 234 with annotation 234a (i.e., "Gas station on right-hand corner before turn"). Furthermore, a contributor (i.e., a user of a service providing directions) that submitted an annotation may be identified by, for example, user name or any appropriate identifier (e.g., annotation 234 was contributed by "driver08"). Although one exemplary annotation is shown in FIG. 6, data table 600 may store multiple annotations for the same maneuver as well as annotations for other maneuvers that are not shown in data table 600. For example, several contributors might provide an annotation for the same maneuver. Criteria that server 110 may use when selecting an annotation from a plurality of annotations that are applicable to a particular maneuver are discussed below.

Figure 7:
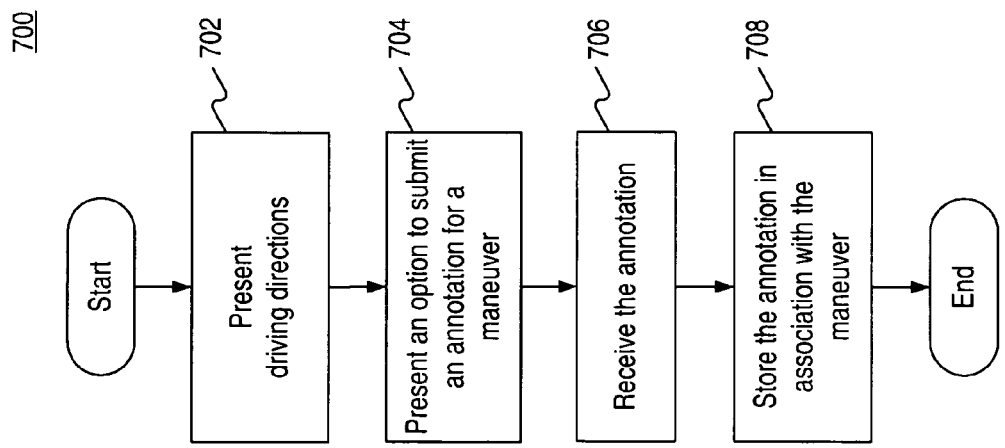
FIG. 7 is a flow diagram of an exemplary method for collecting user-contributed annotations, consistent with a disclosed embodiment.

FIG. 7 is a flow diagram 700 of an exemplary method for collecting user-contributed annotations, consistent with a disclosed embodiment. For example, the method may be implemented by server 110 when presenting driving directions to a user over network 160. In the following discussion, the example show in FIGS. 2-4 is discussed (i.e., a starting point of 1205 Market Street to an ending point of 876 Baker Street).

At the start of the method, in step 702, server 110 may generate directions for a route and present the directions to a user. For example, server 110 may determine that the route comprises various markers from the starting point to the ending point. The determined route may be the most direct and/or most efficient (i.e., makes use of interstate highways instead of roads with traffic lights) for traveling from the starting point (e.g., 1205 Market Street) to the ending point (e.g., 876 Baker Street). Based on the markers occurring along the determined route (including, for example, markers 401, 402, 403, 404, 405), server 110 may retrieve from, for example, data storage 122, directional data for maneuvers that are associated with the markers (e.g., maneuvers 231-235). Accordingly, server 110 may transmit a set of directions to one of terminals 130-150 over network 160.

Next, in step 704, server 110 may present an option to a user to submit an annotation for one or more maneuvers. For example, as shown in FIG. 2, one or more "Edit" links (e.g., "Edit" link 236) may allow a user to annotate maneuvers. As discussed above, a user may select an option to add (or edit) an annotation for one or more of maneuvers 231-235, as shown in FIG. 2. For example, the user may select "Edit" link 236 to submit a user-contributed annotation for maneuver 231. A text box may be displayed below maneuver 231 in which the user may enter the annotation (e.g., by typing, voice command, etc.). As an example, the user may specify an annotation for maneuver 231 of "Travel past Main Street until you reach an intersection with a four way stop sign." After entering the annotation, the user may select "Finished Editing" button 238 to save the directions with the annotation.

In step 706, server 110 may receive an annotation for one or more maneuvers. For example, one of terminals 130-150 may transmit the annotation over network 160 to server 110.

Next, in step 708, server 110 may store the annotation (e.g., "Travel past Main Street until you reach an intersection with a four way stop sign.") in association with maneuver 231. For example, server 110 may store the annotation in data storage 122 for later use with the directions and/or may save the annotation for later use with other directions in which the directional data with which the annotation is applicable. As discussed above, data table 600, discussed in connection with FIG. 6, shows an example of an annotation that is stored in association with a maneuver.

Figure 8:
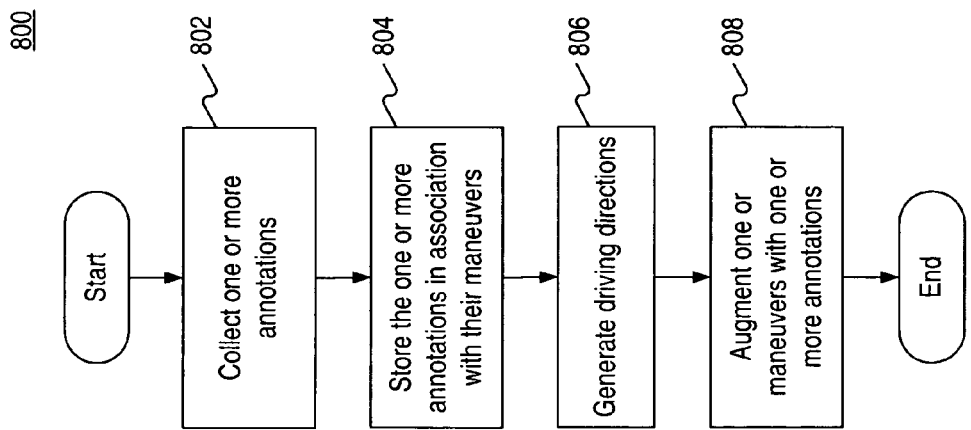
FIG. 8 is a flow diagram of an exemplary method for augmenting driving directions with one or more user-contributed annotations, consistent with a disclosed embodiment.

FIG. 8 is a flow diagram 800 of an exemplary method for augmenting driving directions with one or more user-contributed annotations, consistent with a disclosed embodiment. For example, the method may be implemented by server 110 when selecting an annotation to include in driving directions. In the following discussion, the example shown in FIG. 2 is discussed (i.e., a route having a starting point of 1205 Market Street and a ending point of 876 Baker Street).

At the start of the method, in step 802, server 110 may collect one or more annotations from one or more users. As discussed above, a user may select an option to add an annotation to one or more of maneuvers 231-235, as shown in FIG. 2. For example, the user may select "Edit" link 236 to submit a user-contributed annotation for maneuver 231. A text box may be displayed below maneuver 231 in which the user may enter the annotation (e.g., by typing, voice command, etc.). As discussed above, as an example, the user may specify an annotation for maneuver 231 of "Travel past Main Street until you reach an intersection with a four way stop sign." After entering the annotation, the user may select "Finished Editing" button 238 to save the directions with the annotation.

Next, in step 804, server 110 may store the one or more annotations in association with their maneuvers. As discussed above, server 110 may store the annotation ("Travel past Main Street until you reach an intersection with a four way stop sign") in association with maneuver 231 and/or a particular set of driving directions (e.g., username "driver08" may have saved a set of directions with an annotation that has been added to maneuver 231).

In step 806, server 110 may generate directions for a route. As discussed above, for example, for example, server 110 may determine that the route comprises various markers from the staring point to the ending point. Furthermore, based on the markers occurring along the determined route (including, for example, markers 401, 402, 403, 404, 405), server 110 may retrieve from, for example, data storage 122, directional data for maneuvers that are associated with the markers (e.g., maneuvers 231-235).

In step 808, server 110 may augment one or more maneuvers with one or more user-contributed annotations. For example, server 110 may identify one or more annotations that are applicable to at least one of the maneuvers. For example, maneuver 234, which represents turning right onto Baker Street, is associated with directional data and markers 403, 404, and 405. Annotation 234*a* is stored in data table 600 in association with maneuver 234. Accordingly, server 110 may select annotation 234*a* and augment the driving directions with that annotation. Sever 110 may then transmit the driving directions, including annotation 234*a*, to a user.

As discussed above in connection with FIG. 6, data storage 122 may store a plurality of annotations, more than one of which may be applicable to a given situation. Furthermore, referring again to FIG. 6, contributors of annotations may be identified in data table 600. Several contributors might provide an annotation for a particular maneuver. When selecting an annotation for a maneuver in step 808, server 110 may select the annotation from a plurality of annotations that are available for the maneuver. For example, server 110 may select annotations based on preference information, reliability data, and/or by leveraging social networking data.

In one implementation, various users may contribute annotations, which may be stored in data storage 122. In step 808, before an annotation is incorporated into a set of driving directions, server 110 may determine the reliability of the annotation. For example, reliability may be determined based on feedback from other users regarding the contributor (e.g., the contributor has provided reliable annotations in the past based on a positive feedback score), feedback based on others that have used the annotation information (e.g., the annotation was deemed reliable by other users that used directions that included the annotation), and/or verification by a trusted source of the annotation information (e.g., the provider of the driving directions or a data partner has deemed the annotation to be accurate). For example, if a contributor provided an annotation for a location close to where the contributor lives, server 110 may consider the closeness of the contributor's home and/or business when determining the reliability of the annotation.

Server 110 may evaluate the reliability of an annotation based on one or more of the above factors. For example, taking into account data for more than one factor, server 110 may determine a weighted value that indicates an overall level of reliability of an annotation. When the weighted value exceeds a threshold, server 110 may determine that the annotation information is reliable and may subsequently make the annotation available when generating driving directions. For example, a user may select an option indicating "include annotations" (not shown) when submitting and/or viewing driving directions via user interface 200. Accordingly, server 110 may include the most reliable annotations with the directions when such an option is selected.

Furthermore, server 110 may evaluate the suitability of an annotation for a particular user. For example, a user may have an account stored in data storage 122, which may include a profile indicating user preferences. The user may prefer, for example, to travel a scenic route instead of a highway route, or a shortest route instead of a fastest route. Furthermore, the profile may indicate types of annotations that the user may be interested in observing along a route (e.g., the user is interested in railroad stations). Server 110 may consider the user preferences when selecting annotations. For example, when a user that prefers a scenic route requests driving directions, server 110 may select annotations for scenic landmarks.

Server 110 may use other factors when determining whether to present an annotation to a user. For example, server 110 may provide more than one possible route and prompt the user to pick a particular route. When providing the multiple routes, server 110 may indicate which routes have annotations and/or may indicate how many annotations are available for a particular route. Furthermore, the user may be prompted by server 110 to select an annotation and/or may request to include an annotation for a maneuver. For example, the user may select an annotation from a suggested list of annotations (e.g., select an annotation from these three trusted annotations).

In other implementations, server 110 may leverage social networking data, which may be stored in data storage 122 and/or may be available over network 160. For example, based on a username of a contributor, server 110 may determine whether to include an annotation in a user's directions based on various relationships that may exist between the contributor and the user. For example, server 110 may determine that the contributor is known to the user (e.g., on the user's instant messaging buddy list, is a frequent email contact of the user, someone that the user has designated as a trusted source, etc.). Furthermore, server 110 may determine that a contributor is within a certain degree of separation from the user. For example, a contributor may not be known by the user, but the contributor may be known by a friend of the user (e.g., server 110 may evaluate degrees of separation between contributors and users). Accordingly, a user may select an option enabling annotations from persons in a contact list and/or from persons that are known by certain contacts of the user (e.g., include any annotations from friends of Sally).

In other implementations, a user may submit a route modification for a route that was determined by server 110. For example, a user may have personal knowledge of a better route and, accordingly, may modify the route (e.g., by clicking and dragging a route displayed on a user interface). Server 110 may store the route modification and may, optionally, store one or more annotations submitted by the user that modified the route. The annotations may, for example, explain a reason why the modified route is preferable (e.g., this route has less traffic in the morning).

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and methods of embodiments of this invention are within the skill of an experienced developer. The various programs or program modules can be created using any of the techniques known to one skilled in the art or can be designed in connection with existing software. For example, program sections or program modules can be designed in or by means of Java, C++, HTML, XML, HTML with included Java applets, and/or other software and/or languages (e.g., Ruby, Python, TCL, .NET, etc.) as well as can use other data formats, XML variants, and/or transfer protocols (e.g., XMPP, HTTP, etc.). One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed routines may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method, the method comprising:
    presenting to a user a set of computer-generated driving directions including a plurality of maneuvers;
    in association with presenting to the user the set of driving directions, presenting to the user an option to submit an annotation for one of the plurality of maneuvers;
    in response to presenting the option to the user, receiving the annotation from the user and storing the user-submitted annotation in association with an identification of the one of the plurality of maneuvers;
    determining a reliability of the user-submitted annotation based on feedback from other users who have used directions that included the user-submitted annotation; and
    augmenting, based on the determined reliability of the user-submitted annotation, the one of the plurality of maneuvers with the user-submitted annotation.

2. The method of claim 1, wherein presenting the set of computer-generated driving directions comprises transmitting a document including the set of directions.

3. The method of claim 1, wherein presenting the option to submit the annotation comprises providing a link or a button in a document that is transmitted to the user.

4. The method of claim 1, further comprising:
    receiving a request to display the set of computer-generated driving directions including the annotation.

5. The method of claim 4 further comprising:
    receiving a revision of the annotation from the user; and
    storing the revision of the annotation with the set of computer-generated directions.

6. A computer-implemented method for generating driving directions augmented by maneuver-specific annotations, the method comprising:
    collecting, through a computer-operated driving directions system, a user-submitted annotation for a maneuver;
    storing the user-submitted annotation in association with the maneuver;
    automatically generating by the computer-operated driving directions system, in response to a user request, a set of driving directions that includes a plurality of maneuvers;
    determining a reliability of the user-submitted annotation based on feedback from other users who have used directions that included the user-submitted annotation; and
    augmenting one of the plurality of maneuvers in the set of driving directions with the user-submitted annotation based on a determination that the user-submitted annotation is reliable.

7. The method of claim 6 wherein collecting the user-submitted annotation for the maneuver comprises presenting to a user an option to submit one or more annotations.

8. The method of claim 6 wherein storing the user-submitted annotation in association with the maneuver comprises storing the user-submitted annotation in association with a plurality of markers that are associated with the maneuver.

9. The method of claim 6 wherein augmenting one of the plurality of maneuvers in the set of driving directions with the user-submitted annotation comprises evaluating a reliability of the user-submitted annotation.

10. A computer-implemented method for generating driving directions augmented by maneuver-specific annotations, the method comprising:
    automatically generating, by a computer-operated driving directions system, in response to a user request, a set of driving directions that includes a plurality of maneuvers;
    evaluating a reliability of a user-submitted annotation based on feedback from other users who have used directions that included the user-submitted annotation, wherein the user-submitted annotation is stored in association with one of the plurality of maneuvers;
selecting the user-submitted annotation based on a result of the evaluating; and
augmenting the one of the plurality of maneuvers in the set of driving directions with the selected user-submitted annotation.

11. The method of claim 10, further comprising:
receiving a request to display the set of computer-generated driving directions including the annotation.

12. The method of claim 11, further comprising:
receiving a revision of the annotation from the user; and
storing the revision of the annotation with the set of computer-generated directions.

13. A system for generating driving directions augmented by maneuver-specific annotations, the system comprising:
a data storage storing a plurality of user-submitted annotations; and
a server, the server configured to:
automatically generate, in response to a user request, a set of driving directions that includes a plurality of maneuvers,
evaluate a reliability of one of the plurality of user-submitted annotations based on feedback from other users who have used directions that included the user-submitted annotation, wherein the user-submitted annotation is stored in association with one of the plurality of maneuvers, and
augment the one of the plurality of maneuvers in the set of driving directions with the evaluated user-submitted annotation.

14. The system of claim 13 wherein the server is further configured to:
receive a request to display the set of computer-generated driving directions including the annotation.

15. The system of claim 12 wherein the server is further configured to:
receive a revision of the annotation from the user; and
store the revision of the annotation with the set of computer-generated directions.

16. A non-transitory computer-readable medium storing instructions, the instructions executable by one or more processors to:
present to a user a set of computer-generated driving directions including a plurality of maneuvers;
present to the user an option to submit an annotation for at least one of the plurality of maneuvers;
receive the annotation from the user;
store the user-submitted annotation in association with an identification of the at least one of the plurality of maneuvers;
determine a reliability of the user-submitted annotation based on feedback from other users who have used directions that included the user-submitted annotation; and
augment, based on the determined reliability of the user-submitted annotation, the at least one of the plurality of maneuvers with the user-submitted annotation.

17. The computer-readable medium of claim 16 wherein the instructions further cause the one or more processors to:
provide a link or a button in a document to enable the user to submit the annotation for the at least one of the plurality of maneuvers.

18. The computer-readable medium of claim 16, wherein the instructions further cause the one or more processors to:
receive a request to display the set of computer-generated driving directions including the annotation.

19. The computer-readable medium of claim 18 wherein the instructions further cause the one or more processors to:
receive a revision of the annotation from the user; and
store the revision of the annotation with the set of computer-generated directions.

* * * * *